(12) United States Patent
Elizondo, II

(10) Patent No.: US 9,870,495 B2
(45) Date of Patent: Jan. 16, 2018

(54) SYSTEM AND METHOD USING FREQUENCY HOPPING TO IDENTIFY ITEMS TAGGED WITH RFID TAGS IN AN ENCLOSED SPACE

(71) Applicant: MEPS Real-Time, Inc., Carlsbad, CA (US)

(72) Inventor: Paul M. Elizondo, II, Escondido, CA (US)

(73) Assignee: MEPS Real-Time, Inc., Carlsbad, CA (US)

(*) Notice: Subject to any disclaimer, the term of this patent is extended or adjusted under 35 U.S.C. 154(b) by 0 days.

(21) Appl. No.: 15/162,555

(22) Filed: May 23, 2016

(65) Prior Publication Data

US 2016/0267301 A1 Sep. 15, 2016

Related U.S. Application Data

(63) Continuation of application No. 14/142,749, filed on Dec. 28, 2013, now Pat. No. 9,349,030.
(Continued)

(51) Int. Cl.
*G08B 21/00* (2006.01)
*G06K 7/10* (2006.01)
(Continued)

(52) U.S. Cl.
CPC ..... *G06K 7/10356* (2013.01); *G06K 7/10366* (2013.01); *G06Q 10/087* (2013.01);
(Continued)

(58) Field of Classification Search
CPC ...... A61B 2019/448; A61B 2019/4826; A61B 2019/5251; G06K 2017/009;
(Continued)

(56) References Cited

U.S. PATENT DOCUMENTS

| 7,034,688 B2 | 4/2006 | Rietzler et al. |
| 7,081,819 B2 | 7/2006 | Martinez de Velasco Cortina et al. |

(Continued)

FOREIGN PATENT DOCUMENTS

| EP | 1840854 A2 | 10/2007 |
| KR | 1020120032790 A | 4/2012 |

OTHER PUBLICATIONS

International Search Report—KIPO—dated Apr. 25, 2014.

*Primary Examiner* — Mark Rushing
(74) *Attorney, Agent, or Firm* — Thomas A. Runk; Brooks Kushman P.C.

(57) ABSTRACT

A system and method comprises a plurality of RF antennas having beams directed to a storage space in which medical items having RFID tags are stored. Each antenna is controlled to inject energy at a different frequency in a frequency-hopping set of frequencies to activate the tags. The return signal strength is monitored and for each tag that responds, the antenna location, frequency of the injected energy, identification response, and signal strength are stored as identification data. If a tag fails to respond in new scans, the antenna at which the tag last responded receives all the frequency-hopping frequencies in an attempt to locate the tag. If new tags are found, they are compared to a list of expected new medical items.

17 Claims, 3 Drawing Sheets

Related U.S. Application Data

(60) Provisional application No. 61/747,214, filed on Dec. 29, 2012.

(51) Int. Cl.
*G06Q 10/08* (2012.01)
*H04B 1/713* (2011.01)
*G06K 17/00* (2006.01)

(52) U.S. Cl.
CPC ..... *H04B 1/713* (2013.01); *G06K 2017/0045* (2013.01); *G06K 2017/0051* (2013.01)

(58) Field of Classification Search
CPC ... G06K 2017/0045; G06K 2017/0051; G06K 7/10356
See application file for complete search history.

(56) References Cited

U.S. PATENT DOCUMENTS

| | | |
|---|---|---|
| 7,091,860 B2 | 8/2006 | Martinez de Velasco Cortina et al. |
| 7,091,862 B2 | 8/2006 | Martinez de Velasco Cortina |
| 7,463,154 B2 | 12/2008 | Cortina et al. |
| 7,518,516 B2 | 4/2009 | Azevedo et al. |
| D603,383 S | 11/2009 | Nyalamadugu et al. |
| 7,671,746 B2 | 3/2010 | Martinez de Velasco Cortina et al. |
| 7,787,837 B2 | 8/2010 | Mikuteit |
| 7,884,725 B2 | 2/2011 | Kruest et al. |
| 2006/0132311 A1 | 6/2006 | Kruest et al. |
| 2006/0187063 A1 | 8/2006 | Rietzler et al. |
| 2007/0018787 A1 | 1/2007 | Martinez de Velasco Cortina et al. |
| 2007/0060075 A1 | 3/2007 | Mikuteit |
| 2007/0268133 A1 | 11/2007 | Sanchez et al. |
| 2008/0018489 A1 | 1/2008 | Kruest et al. |
| 2008/0024273 A1 | 1/2008 | Kruest et al. |
| 2008/0030342 A1 | 2/2008 | Elizondo et al. |
| 2008/0075146 A1 | 3/2008 | Rofougaran |
| 2008/0084275 A1 | 4/2008 | Azevedo et al. |
| 2008/0094206 A1 | 4/2008 | Martinez de Velasco Cortina et al. |
| 2008/0094214 A1 | 4/2008 | Azevedo et al. |
| 2008/0135615 A1 | 6/2008 | Moran |
| 2008/0136619 A1 | 6/2008 | Moran |
| 2008/0284600 A1 | 11/2008 | Drzaic et al. |
| 2009/0002134 A1 | 1/2009 | McAllister |
| 2009/0015382 A1 | 1/2009 | Greefkes |
| 2009/0021379 A1 | 1/2009 | Zhu et al. |
| 2009/0079068 A1 | 3/2009 | Olanoff |
| 2009/0122986 A1 | 5/2009 | Tahan et al. |
| 2009/0201152 A1 | 8/2009 | Karr et al. |
| 2009/0251293 A1 | 10/2009 | Azevedo et al. |
| 2010/0026468 A1 | 2/2010 | Nyalamadugu et al. |
| 2010/0090833 A1 | 4/2010 | Mullis et al. |
| 2010/0150348 A1 | 6/2010 | Fairbanks et al. |
| 2010/0188191 A1 | 7/2010 | Martinez de Velasco Cortina et al. |
| 2010/0332838 A1 | 12/2010 | Zhu et al. |
| 2011/0133905 A1 | 6/2011 | Hussain et al. |
| 2011/0163849 A1 | 7/2011 | Kruest et al. |
| 2011/0163879 A1 | 7/2011 | Kruest et al. |
| 2012/0249303 A1 | 10/2012 | Hadley et al. |
| 2014/0361078 A1* | 12/2014 | Davidson ........... G06K 7/10356 235/385 |

* cited by examiner

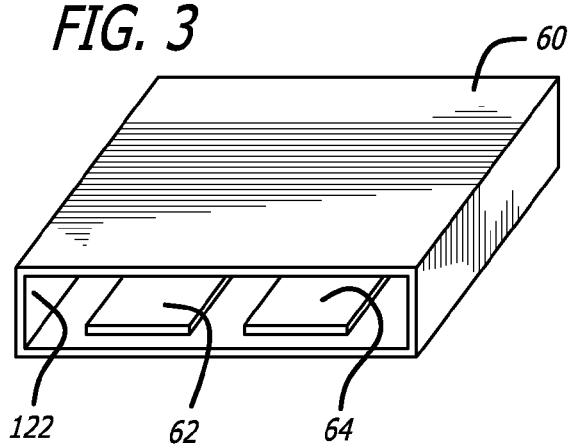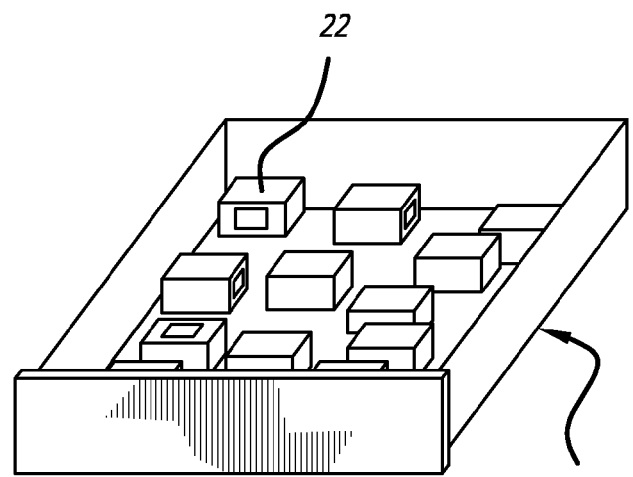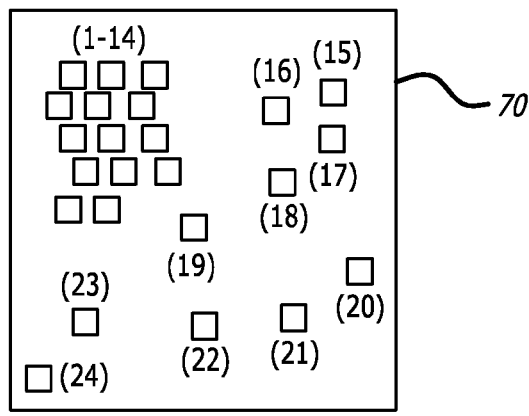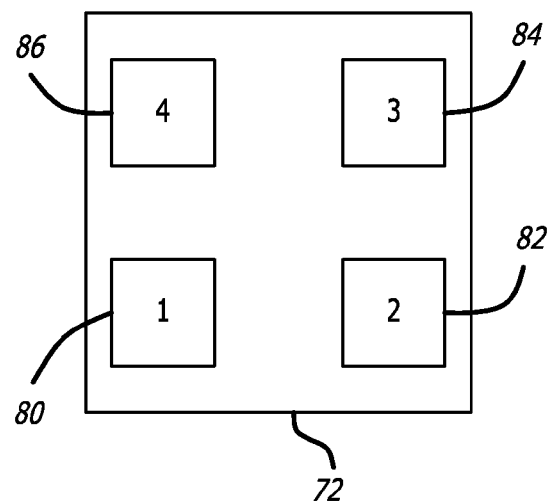

SYSTEM AND METHOD USING FREQUENCY HOPPING TO IDENTIFY ITEMS TAGGED WITH RFID TAGS IN AN ENCLOSED SPACE

CROSS-REFERENCE TO RELATED APPLICATION

This is a continuation application of U.S. application Ser. No. 14/142,749 filed Dec. 28, 2013, now U.S. Pat. No. 9,349,030, which claims the benefit of U.S. Provisional Application No. 61/747,214, filed Dec. 29, 2012, both of which are incorporated by reference in their entireties.

BACKGROUND

The invention relates generally to the field of automatically and wirelessly collecting data from items being tracked, and more particularly, to a system and method of detecting and identifying items more accurately with multiple scans.

There are a number of ways of identifying and tracking items including visually, optically (bar coding, for example), magnetically, RFID, weighing, and others. Where an automatic system for tracking is desired, RFID is a candidate since identification data may be obtained wirelessly. RFID tags have decreased in cost, which has made them even more attractive for such an application.

Radio-frequency identification ("RFID") is the use of electromagnetic energy ("EM energy") to stimulate a responsive device (known as an RFID "tag" or transponder) to identify itself and in some cases, provide additionally stored data. RFID tags typically include a semiconductor device having a memory, circuitry (collectively the "circuitry element"), and one or more conductive traces that form an antenna. Typically, RFID tags act as transponders, providing information stored in the semiconductor device memory of the circuitry element in response to an RF interrogation signal received from a reader, also referred to as an interrogator. Some RFID tags include security measures, such as passwords and/or encryption. Many RFID tags also permit information to be written or stored in the semiconductor memory via an RF signal.

RFID tags may be incorporated into or attached to items to be tracked. In some cases, the tag may be attached to the outside of an item with adhesive, tape, or other means and in other cases, the tag may be inserted within the item, such as being included in the packaging, located within the container of the item, or sewn into a garment. The RFID tags are manufactured with an identification number which is typically a simple serial number of a few bytes with a check digit attached. This identification number is incorporated into the tag during manufacture. The user cannot alter this serial/identification number and manufacturers guarantee that each serial number is used only once. This configuration represents the low cost end of the technology in that the RFID tag is read-only and it responds to an interrogation signal only with its identification number. Typically, the tag continuously responds with its identification number. Data transmission to the tag is not possible. These tags are very low cost and are produced in enormous quantities.

Such read-only RFID tags typically are permanently attached to an item to be tracked and, once attached, the serial number of the tag is associated with its host item in a computer data base. For example, a particular type of medicine may be contained in hundreds or thousands of small vials. Upon manufacture, or receipt of the vials at a health care institution, an RFID tag is attached to each vial. Each vial with its permanently attached RFID tag will be checked into the data base of the health care institution upon receipt. The RFID identification number may be associated in the data base with the type of medicine, size of the dose in the vial, and perhaps other information such as the expiration date of the medicine. Thereafter, when the RFID tag of a vial is interrogated and its identification number read, the data base of the health care institution can match that identification number with its stored data about the vial. The contents of the vial can then be determined as well as any other characteristics that have been stored in the data base. This system requires that the institution maintain a comprehensive data base regarding the items in inventory rather than incorporating such data into an RFID tag.

An object of the tag is to associate it with an item throughout the item's life in a particular facility, such as a manufacturing facility, a transport vehicle, a health care facility, a storage area, or other, so that the item may be located, identified, and tracked, as it is moved. For example, knowing where certain medical items reside at all times in a health care facility can greatly facilitate locating needed medical supplies when emergencies arise. Similarly, tracking the items through the facility can assist in generating more efficient dispensing and inventory control systems as well as improving work flow in a facility. Additionally, expiration dates can be monitored and those items that are older and about to expire can be moved to the front of the line for immediate dispensing. This results in better inventory control and lowered costs.

Other RFID tags are writable and information about the item to which the RFID tag is attached can be programmed into the individual tag. While this can provide a distinct advantage when a facility's computer servers are unavailable, such tags cost more, depending on the size of the memory in the tag. Programming each one of the tags with information contained in the item to which they are attached involves further expense. As used herein, the term "item" has the same meaning as the word "article."

RFID tags may be applied to containers or items to be tracked by the manufacturer, the receiving party, or others. In some cases where a manufacturer applies the tags to the product, the manufacturer will also supply a respective data base file that links the identification number of each of the tags to the contents of each respective item thereby "associating" the RFID tag with the product, or vial, or item, or item. That manufacturer-supplied data base can be distributed to the customer in the form of an electronic file that may easily be imported into the customer's overall data base thereby saving the customer from the expense of creating the data base.

Data base creation can also be a problem from an efficiency aspect. It has been noted that errors are often made when creating the data base manually at a health care facility. Numbers can be transposed, left off, or incorrectly entered, as can expiration dates, and other important information. Receiving the data base file from the manufacturer usually results in far fewer errors or none at all. Additionally, the data base file from the manufacturer may be conveniently available through the Internet, which involves none of the handling problems that arise from time to time with physical media. Problems such as the digital versatile disc ("DVD") on which the data base has been written cannot be read, or is missing from the shipment, are avoided. Furthermore, making the data base available as a downloadable file over the Internet allows the manufacturer to make last minutes changes as the products are being shipped out the door.

Many RFID tags used today are passive in that they do not have a battery or other autonomous power supply and instead, must rely on the interrogating energy provided by an RFID reader to provide power to activate the tag. Passive RFID tags require an electromagnetic field of energy of a certain frequency range and certain minimum intensity in order to achieve activation of the tag and transmission of its stored data. Another choice is an active RFID tag; however, such tags require an accompanying battery to provide power to activate the tag, thus increasing the expense of the tag and making them undesirable for use in a large number of applications.

Depending on the requirements of the RFID tag application, such as the physical size of the items to be identified, their location, and the ability to reach them easily, tags may need to be read from a short distance or a long distance by an RFID reader. Such distances may vary from a few centimeters to ten or more meters. Additionally, in the U.S. and in other countries, the frequency range within which such tags are permitted to operate is limited. As an example, lower frequency bands, such as 125 KHz and 13.56 MHz, may be used for RFID tags in some applications. At this frequency range, the electromagnetic energy is less affected by liquids and other dielectric materials, but suffers from the limitation of a short interrogating distance. At higher frequency bands where RFID use is permitted, such as 915 MHz and 2.4 GHz, the RFID tags can be interrogated at longer distances, but they de-tune more rapidly as the material to which the tag is attached or is nearby varies. It has also been found that at these higher frequencies, closely spaced RFID tags will de-tune each other as the spacing between tags is decreased.

There are a number of common situations where the RFID tags may be located inside enclosures. Some of these enclosures may have entirely or partially metal or metallized surfaces. Examples of enclosures include metal enclosures (e.g., shipping containers), partial metal enclosures (e.g., vehicles such as airplanes, buses, trains, and ships that have a housing made from a combination of metal and other materials such as glass), and non-metal enclosures (e.g., warehouses and buildings made of wood). Examples of objects with RFID tags that may be located in these enclosures include loose items, packaged items, parcels inside warehouses, inventory items inside buildings, various goods inside retail stores, and various portable items (e.g., passenger identification cards and tickets, baggage, cargo, individual life-saving equipment such as life jackets and masks) inside vehicles, etc.

The read range (i.e., the range of the interrogation and/or response signals) of RFID tags is limited. For example, some types of passive RFID tags have a maximum range of about twelve meters, which may be attained only in ideal free space conditions with favorable antenna orientation. In a real situation, the observed tag range is often six meters and can be much less. Therefore, some of the enclosures described above may have dimensions that far exceed the read range of an individual RFID tag. Unless the RFID reader can be placed in close proximity to a target RFID tag in such an enclosure, the tag will not be activated and read. Additionally, metal surfaces of the enclosures present a serious obstacle for the RF signals that need to be exchanged between RFID readers and RFID tags, making RFID tags located behind or in close proximity to those metal surfaces difficult or impossible to detect.

In addition to the above, the detection range of the RFID systems is typically limited by signal strength to short ranges, frequently less than about thirty centimeters for 13.56 MHz systems. Therefore, portable reader units may need to be moved past a group of tagged items in order to detect all the tagged items, particularly where the tagged items are stored in a space significantly greater than the detection range of a stationary or fixed single reader antenna. Alternately, a large reader antenna with sufficient power and range to detect a larger number of tagged items may be used. However, such an antenna may be unwieldy and may increase the range of the radiated power beyond allowable limits which may cause the reader to read unrelated tags positioned outside the target enclosure causing inaccuracy. Furthermore, these reader antennas are often located in stores or other locations where space is at a premium and it is expensive and inconvenient to use such large reader antennas. In another possible solution, multiple small antennas may be used but such a configuration may be awkward to set up when space is at a premium and when wiring is preferred or required to be hidden.

In the case of medical supplies and devices, it is desirable to develop accurate tracking, inventory control systems, and dispensing systems so that RFID tagged devices and items may be located quickly should the need arise, and may be identified for other purposes, such as expiration dates. One common scenario is the restocking of an ADC. The pharmacy may prepare a large order for restocking an ADC somewhere in a health care facility and will want to track the order to be sure that it was successfully and completely delivered to the ADC. The ADC may be programmed to scan all items in its storage spaces once the doors or drawers are closed after restocking and communicate that newly-scanned inventory to the pharmacy. The pharmacy server may then compare the newly-scanned inventory in the ADC to the inventory sent to the ADC to verify that all medical items reached the ADC. If a shortage appears to exist, it would be helpful to have a system and method that can rescan the ADC storage spaces in a different manner to be sure there is a shortage, before someone must be sent to examine manually the contents of the ADC.

In the case of medical supply or dispensing cabinets used in a health care facility, a large number of medical devices and items are located closely together, such as in a plurality of drawers. Cabinets such as these are typically made of metal, which can make the use of an external RFID system for identification of the stored items difficult. In some cases, such cabinets are locked due to the presence of narcotics, expensive medication, or other medical items or apparatus within them that are subject to a high theft rate. Thus, manual identification of the cabinet contents is difficult due to the need to control access.

Providing an internal RFID system in such a cabinet can pose challenges. Where internal items can have random placement within the cabinet, the RFID system must be such that there are no "dead zones" that the RFID system is unable to reach. In general, dead zones are areas in which the level of coupling between an RFID reader antenna and an RFID tag is not adequate for the system to perform a successful read of the tag. The existence of such dead zones may be caused by orientations in which the tag and the reader antennas are in orthogonal planes. Thus, items placed in dead zones may not be detected thereby resulting in inaccurate tracking of tagged items.

It is important that RF-enabled drawers and other enclosures accurately and repeatedly identify a variety of RFID tags attached to items contained in these enclosures. The RFID tags will vary in performance (various integrated circuit ("IC") manufacturers), antenna type (far field, near field, combination, etc.), antenna gain, location of item being tracked, susceptibility to detuning of RFID tags, and antenna design type (linear vs. circular) among other characteristics.

Additionally, it has been noted that some RFID tags underperform. That is, they are more difficult to detect, interrogate, and read under the same circumstances as other tags. Since RFID tags can be made by multiple manufacturers having varying standards and quality control, and rough handling and other environmental factors may damage tags, some of them provide problems in interrogation. Yet it is desirable that every RFID tag be read in an enclosure since the medication or other medical item to which it is attached can be important. It would be helpful to provide an RFID interrogation system that can successfully interrogate such underperforming tags.

Often in the medical field, there is a need to read a large number of tags attached to items in such an enclosure, and as mentioned above, such enclosures have limited access due to security reasons. The physical dimension of the enclosure may need to vary to accommodate a large number of items or items of different sizes and shapes. In order to obtain an accurate identification and count of such closely-located medical items or devices, a robust electromagnetic energy field must be provided at the appropriate frequency within the enclosure to surround all such stored items and devices to be sure that their tags are all are activated and read. Such medical devices may have the RFID tags attached to the outside of their containers and may be stored in various orientations with the RFID tag (and associated antenna) pointed upwards, sideways, downward, or at some other angle in a random pattern.

Additionally, where EM energy is introduced to such an enclosure for reading the RFID tags within, efficient energy transfer is of importance. Under ideal conditions, the power transfer to the enclosure can be favorable while minimizing the reflections of power within the enclosure. Where the enclosure impedance changes due to the introduction of items to the enclosure or removal of items from the enclosure, or many items are stored in one small area near each other and the items are in random orientations with very few, if any, in the desired orientation in respect to the antennas of the enclosure, or some of the RFID tags are underperforming, some or many of the tags on items within the enclosure would not be activated to identify themselves, leaving an ineffective inventory system. It is very important that all tags, and therefore medical items attached to those tags, be activated and read.

It is a goal of many health care facilities to keep the use of EM energy to a minimum, or at least contained. The use of high-power readers to locate and extract data from RFID tags is generally undesirable in health care facilities, although it may be acceptable in warehouses that are sparsely populated with workers, or in aircraft cargo holds. Radiating a broad beam of EM energy at a large area, where that EM energy may stray into adjacent, more sensitive areas, is undesirable. Efficiency in operating a reader to obtain the needed identification information from tags is an objective. Increasing the read power is not a viable option and installing beam steering or other directional technology for the antennas increases the cost and complexity.

Hence, those of skill in the art have recognized a need for an RFID tag reader system in which the efficient use of energy is made to activate and read all RFID tags in an enclosed area. A further need for the efficient use of an existing EM field in enclosures to activate and read tags disposed at random orientations has also been recognized. A further need has been recognized for an automated system to identify items stored in a metal cabinet without the need to gain access to the cabinet. Hence, those skilled in the art have recognized a need for more accurately and repeatedly identifying a large population of differing performance RFID tags attached to various size and differing material packages containing differing forms of medication, positioned in various orientations, located in differing strength RF fields, and contained in a shielded RF-enabled enclosure. Those of skill in the art have also recognized a need for an RFID tag reader system in which the efficient use of energy is made to activate and read all RFID tags in an enclosed area. A further need for establishing a robust EM field in enclosures to activate and read tags disposed at random orientations has also been recognized. A further need has been recognized for an automated system to identify items stored in a metal cabinet without the need to gain access to the cabinet. The present invention fulfills these needs and others.

SUMMARY OF THE INVENTION

Briefly and in general terms, the present invention is directed to a system for locating RFID tags that underperform or for other reasons are difficult to activate and identify. The new and novel reader system and method of the present invention makes RFID tag identification much more likely and accurate.

In particular, there is provided a wireless automated reader system to identify medical items having an RFID tag associated with them by reading the tags, the medical items being stored in a storage space of an enclosure, the system comprising a plurality of reader antennas located at different positions, each of which has a beam directed into the storage space of the enclosure for activating and reading RFID tags of items residing in the storage space, a processor having a memory, an energy source having a plurality of different frequency-hopping frequencies, the energy source being responsive to control signals to provide a set of a plurality of injection signals to selected antennas, each injection signal having a different frequency-hopping frequency to selected antennas, and an antenna controller that controls the energy source to deliver the set of a plurality of injection signals to the plurality of reader antennas in a standard data scan in which the antenna controller controls the energy source to deliver an injection signal of a different frequency to each reader antenna and to cycle through the reader antennas with a different injection signal of a different frequency until all of the frequency-hopping frequencies of the set have been used, and to deliver the set of a plurality of injection signals in a concentrated data scan in which a particular reader antenna is selected and the antenna controller controls the energy source to deliver the plurality of injection signals using all of the frequency-hopping frequencies only to the selected antenna, wherein the antenna controller includes an RSSI module (received signal strength indicator) that is configured to analyze the received signal strength of each received response to the injected signals from the RFID tags, and the antenna controller also communicates identification signals representing the frequency, the antenna location, the received signal strength, and the identification response from each of the responding RFID tags, wherein the processor is programmed to receive the identification signals from the antenna controller and store in memory the identification signals as a data scan associated with a particular time, wherein the processor is further programmed to compare the identification signals generated in the present data scan to identification signals previously generated and stored prior data scan to determine if any medical items are missing in the present scan, and wherein if any identifications are found in the comparison to be missing from the present scan, the processor is further programmed to analyze the identification data of a previous data scan to determine the reader antenna that had a higher return signal strength when the missing item was last identified as being present, and to control the energy source and antenna controller to use the concentrated data scan mode at the identified reader antenna to determine if the missing item is in the storage space.

In more detailed aspect, the enclosure comprises a Faraday cage positioned around the entire storage space. The antenna controller controls the energy source to deliver each of the set of a plurality of injection signals to each of the plurality of reader antennas sequentially. The antenna controller controls the energy source to deliver each of the set of a plurality of injection signals to the selected reader antenna sequentially.

In yet more detailed aspects, there is provided a door located to provide access to the storage space, a door sensor connected to the storage space and the door to provide a door-open signal when the door is opened, wherein the processor is programmed to receive the door-open signal from the door sensor and store the door-open signal in a data base in the memory along with a time at which it was received, wherein the processor is further programmed when an item is indicated as missing in a current data scan to search the data base of door open signals and determine if a door-open signal was received between the time of the last stored data scan and the latest data scan, where an item is missing, to determine if a door-open signal was received, and if the door-open signal was received and the concentrated data scan does not locate the missing medical item, the processor provides an item taken signal indicating that the item was taken from the storage area. The processor is programmed to check for missing medical items from the stored standard data scan at a predetermined time of day. The processor is programmed to check for missing medical items from the stored standard data scan immediately after the door is closed after a door-open signal is received. The processor is programmed to notify a remote server each time a missing medical item is determined to have been taken from the storage space.

In yet further aspects in accordance with the invention, the processor is further programmed to identify any new medical items identified in the standard data scan, compare the new medical items identified in the storage space to a predetermined list of expected new medical items to be placed into the storage space. The processor is further programmed to control the antenna controller to initiate the concentrated data scan on at least one of the reader antennas in a case where the comparison shows that not all of the expected new medical items are detected within the storage space.

In a further more detailed aspect, the storage space is devoid of metallic portions whereby medical items placed in the storage space will not come into direct contact with any metallic portions that may detune their RFID devices.

In other more detailed aspects, the processor is programmed to monitor the received signal strength for all the injected frequencies and determines which frequencies provide higher levels of detection of the medical item and stores those frequencies. The processor is further programmed while in the standard data scan mode to determine the location of a medical item in the storage space that is responding to multiple reader antennas by compare the received signal strength readings from the multiple antennas.

In method aspects of the invention, there is provided a method for wirelessly automatically reading RFID tags associated with medical items to identify medical items, the medical items being stored in a storage space of an enclosure, the method comprising, directing a plurality of reader antenna beams from different positions into the storage space of the enclosure for activating and reading RFID tags of items residing in the storage space, delivering a set of a plurality of injection signals to the plurality of reader antennas in a standard data scan in which an injection signal of a different frequency is directed to the storage space by each reader antenna, and cycling through the reader antennas with a different injection signal of a different frequency until all of the frequency-hopping frequencies of the set have been used, and delivering the set of a plurality of injection signals in a concentrated data scan in which a particular reader antenna is selected and delivers the plurality of injection signals using all of the frequency-hopping frequencies only to the selected antenna, monitoring received signal strength of responses of RFID tags to injection signals and communicating identification signals representing the frequency, the antenna location, the received signal strength, and the identification response from each of the responding RFID tags, storing in a memory the received identification signals as a data scan associated with a particular time, comparing the identification signals generated in the present data scan to identification signals previously generated and stored to determine if any medical items are missing in the present scan, and wherein if any identifications are found in the comparison to be missing from the present scan, analyzing the identification data of a previous data scan to determine the reader antenna that had a higher return signal strength when the missing item was last identified as being present, and using the concentrated data scan mode at the identified reader antenna to determine if the missing item is in the storage space.

In further more detailed method aspects, the method further comprises monitoring opening of a door located to provide access to the storage space and providing a door-open signal when the door is opened, storing the door-open signal in a data base along with a time associated therewith, searching the data base of door-open signals and determining if a door-open signal was received between the time of the last stored data scan and the latest data scan, where an item is missing, to determine if a door-open signal was received, and if the door-open signal was received and the concentrated data scan does not locate the missing medical item, providing an item taken signal indicating that the item was taken from the storage area. The method further comprises checking for missing medical items from the stored standard data scan at a predetermined time of day. The method further comprises checking for missing medical items from the stored standard data scan immediately after the door is closed after a door-open signal is received.

In yet other detailed method aspects, the method further comprises notifying a remote server each time a missing medical item is determined to have been taken from the storage space. Additionally, the method further comprises identifying any new medical items identified in the standard data scan, and comparing the new medical items identified in the storage space to a predetermined list of expected new medical items to be placed into the storage space. The method further comprises initiating the concentrated data scan on at least one of the reader antennas in a case where the comparison shows that not all of the expected new medical items are detected within the storage space.

The features and advantages of the invention will be more readily understood from the following detailed description that should be read in conjunction with the accompanying drawings.

BRIEF DESCRIPTION OF THE DRAWINGS

FIG. 3 shows an enclosure comprising a Faraday cage in this embodiment with a storage space within the enclosure, in which a plurality of RFID reader antennas are disposed to identify RFID tags located within the storage space;

FIG. 4 is a perspective view of a plurality of RFID-tagged items randomly located in a drawer of an ADC or other enclosure;

FIG. 5 is a top view of the drawer of FIG. 4 showing the distribution of RFID-tagged items;

FIG. 6 is a top view of the location of four RFID reader antennas for identifying and locating RFID-tagged items in the drawer shown in FIG. 5.

DETAILED DESCRIPTION OF EMBODIMENTS

Figure 1:
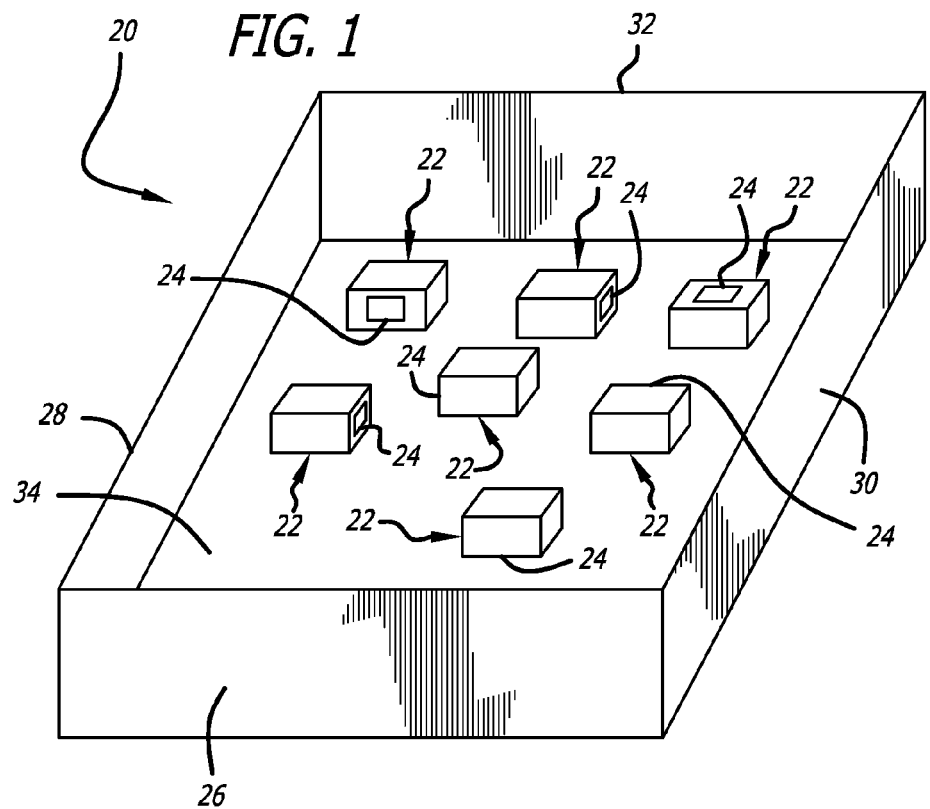
FIG. 1 is a schematic diagram of a drawer that may be positioned within a medical dispensing cabinet, showing the storage of a plurality of medical articles randomly positioned in the drawer, each of those articles having an integral RFID tag oriented randomly.

Referring now in more detail to the exemplary drawings for purposes of illustrating embodiments of the invention, wherein like reference numerals designate corresponding or like elements among the several views, there is shown in FIG. 1 a schematic representation of a partial enclosure 20 in which a plurality of medical items 22 are stored, each with a respective RFID tag 24 that has an identification number. The partial enclosure may comprise a drawer having a front 26, a left side 28, a right side 30, a rear 32, and a bottom 34. These items are randomly distributed in the drawer with the RFID tags facing in various and random directions.

As used in regard to the embodiments herein, "reader" and "interrogator" refer to a device that may read or write/read. The data capture device is always referred to as a reader or an interrogator regardless of whether it can only read or is also capable of writing. A reader typically contains a radio frequency module (a transmitter and a receiver, sometimes referred to as a "transceiver"), a control unit, and a coupling element (such as an antenna or antennas) to the RFID tag. Additionally, many readers include an interface for forwarding data elsewhere, such as an RS-232 interface. The reader, when transmitting, has an "interrogation zone" or "beam" within which an RFID tag will be activated. When within the interrogation zone, the RFID tag will draw its power from the electrical/magnetic field created in the interrogation zone by the reader. In a sequential RFID system (SEQ), the interrogation field is switched off at regular intervals. The RFID tag is programmed to recognize these "off" gaps and they are used by the tag to send data, such as the tag's unique identification number. In some systems, the tag's data record contains a unique serial number that is incorporated when the tag is manufactured and which cannot be changed. This number may be associated in a data base with a particular item when the tag is attached to that item. Thus, determining the location of the tag will then result in determining the location of the item to which it is attached. In other systems, the RFID tag may contain more information about the item to which it is attached, such as the name or identification of the item, its expiration date, its dose, the patient name, and other information. The RFID tag may also be writable so that it can be updated.

As used in regard to the embodiments herein, "tag" is meant to refer to an RFID transponder. Such tags typically have a coupling element, such as an antenna, and an electronic microchip. The microchip includes data storage, also referred to as memory.

Figure 2:
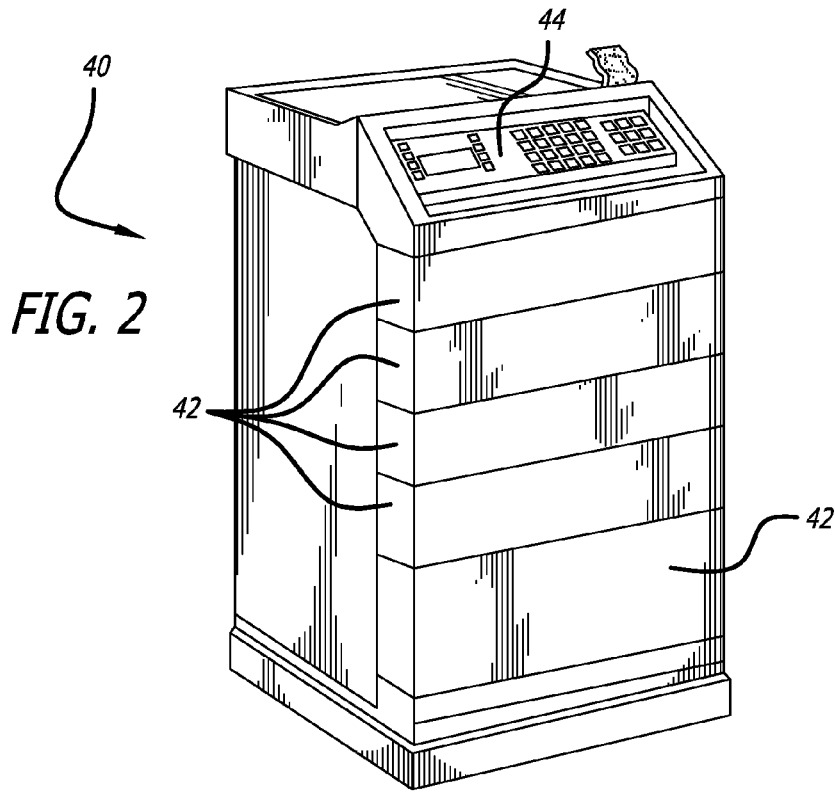
FIG. 2 is a perspective view of a medication dispensing cabinet having five drawers, one of which is similar to the schematic view of FIG. 1, the cabinet also having an integral computer for controlling access to the cabinet and performing inventory tracking by periodically reading any RFID tags placed on articles stored within the cabinet, and for reporting the identified articles to a remote computer.

FIG. 2 presents a representative medical dispensing cabinet 40 also known as an automated dispensing cabinet ("ADC") comprising a plurality of movable drawers 42. In this embodiment, there are five drawers that slide outwardly from the cabinet so that access is provided to the contents of the drawers. FIG. 1 is a schematic diagram of a representative drawer that may be positioned within the cabinet of FIG. 2 for sliding outward to provide access to the drawer's contents and for sliding inward into the cabinet to secure the drawer's contents. The cabinet also comprises an integral computer 44 that may be used to control access to the drawers and to generate data concerning access and contents, and to communicate with other systems. In this embodiment, the computer generates data concerning the number and type of items in the drawers, the names of the patients for whom they have been prescribed, the prescribed medications and their prescribed administration dates and times, as well as other information. In a simpler system, the computer may simply receive unique identification numbers from stored items and pass those identification numbers to an inventory control computer that has access to a data base for matching the identification numbers to item descriptions.

Such a cabinet may be located at a nursing station on a particular floor of a health care institution and may contain the prescriptions for the patients of that floor. As prescriptions are prepared for the patients of that floor, they are delivered and placed into the cabinet 40. They are logged into the integral computer 44, which may notify the pharmacy of their receipt. A drawer may also contain non-prescription medical supplies or items for dispensing to the patients as determined by the nursing staff. At the appropriate time, a nurse would access the drawer in which the medical items are stored through the use of the computer 44, remove a particular patient's prescriptions and any needed non-prescription items, and then close the drawer so that it is secured. In order to access the cabinet, the nurse may need to provide various information and may need a secure access code. The drawers 42 may be locked or unlocked as conditions require.

The computer 44 in some cases may be in communication with other facilities of the institution. For example, the computer 44 may notify the pharmacy of the health care institution that a patient's prescription has been removed from the cabinet for administration at a particular day and time. The computer may also notify the finance department of the health care institution of the removal of prescriptions and other medical items for administration to a particular patient. This medication may then be applied to the patient's account. Further, the computer 44 may communicate to administration for the purpose of updating a patient's Medication Administration Record (MAR), or e-MAR. The medication cabinet 40 computer 44 may be wirelessly connected to other computers of the health care institution or may have a wired connection. The cabinet may be mounted on wheels and may be moved about as needed or may be stationary and unable to move.

Although not shown, each of the five drawers of the ADC 40 contains a door or drawer open sensor that detects when the respective drawer is opened. A door-open signal is generated and received by the integral computer 44 of the ADC. The signal is stored in a data base along with the time for possible future reference.

Turning now to FIG. 3, an enclosure 60 is shown having at least the two antennas 62 and 64. In this embodiment, the antennas are known as "patch" antennas but other types of antennas will also function adequately. The RF enclosure 60 in FIG. 3 takes the form of a Faraday cage in which all six sides are metallic and are interconnected. The front "side" has been removed in FIG. 3 for illustration purposes so that the internal patch antennas 62 and 64 can be seen.

In addition to the variables described above, the location of the RFID tag in the RF-enabled enclosure 60 will also affect the ability of the RF reader system to identify accurately and repeatedly all RFID tags in the enclosure. These variables not only include the location of the RFID tag in the enclosure, but also the orientation of the RFID tag, proximity of the tag to the enclosure walls and the drawer material (surfaces), proximity of the tag to other tracked items (various materials in tracked items), among others. For example, FIG. 4 shows various RFID tagged items 22 randomly oriented in a drawer 70. These items must be identified and located. (The drawing numeral "22" is used only once in FIG. 4 to preserve the clarity of the figure. However, it is meant to indicate all such items within the drawer 70).

The read performance of RFID tags will vary from one design to another. "Read performance" can be defined by a variety of RFID tag characteristics: read distance of a single tag in free space, antenna polarization (linear or circular), sensitivity to adjacent tags, sensitivity to metal in close proximity, sensitivity to detuning from packaging materials, among others. All of the above performance characteristics affect the statistical probability that a tag can be identified in an enclosure (RF-enabled) with multiple antennas. In addition to variations in performance between differing tag designs, performance can also vary from one tag to another of the same design. Variations in the tag assembly process, the tag antenna material, and possibly the IC characteristics can result in performance variation within a group of one tag type/design.

The known prior art depends on the spatial diversity created in an RF-enabled enclosure by using multiple antennas, frequency hopping, and variations in RF power. The problem with this technique is that the process does not change from one item loading profile to another.

The invented system and method analyze the Return Signal Sensitivity Indicator (RSSI) values for RFID tags attached to items being tracked in an RF-enabled enclosure and generates a concentrated or "custom" read process that maximizes the statistical probability that all RFID tags in the enclosure will be identified. The RSSI data is collected from multiple read cycles during which antenna, frequency, and RF power are varied. If necessary, one or more poor performing tags, or the fact that one or more tags are not identified, (the ideal implementation of the invention would require that the number of tags be known to the system during initial setup), may necessitate customized RSSI data collection cycles. The RSSI data collection process can take from fifteen to thirty minutes depending on tag population and complexity of the data collection variables. Therefore, the data collection process is executed during periods of the day when the system is not in use. The invented system and method analyze the RFID tag RSSI data and generates a concentrated read process for that specific loading of tracked items.

As an example of how the invention works, imagine the top view of a drawer 70 shown in FIG. 5, superimposed over the enclosure top view showing the location of the antennas 80, 82, 84, and 86 in the enclosure 72 in FIG. 6. In this example, RFID tags nos. 1-14 (indicated in parentheses) are directly above antenna 4, RFID tag no. 23 is directly above antenna 1, RFID tag no. 21 is directly above antenna 2, and RFID tag no. 15 is directly above antenna 3. In its simplest form, the invention acquires the RSSI value of each RFID tag possible from one antenna at a time. In this example, reading tags using antenna 4 will result in high RSSI values from RFID tags 1-14 (RSSI values are provided from the reader in dbm. The more negative the RSSI value, the weaker the signal. Typical RSSI values for UHF RFID tags range from −35 dbm to −65 dbm) while all other tags will yield RSSI values lower than RFID tags 1-14. Note: some tags in the enclosure may not be identified by antenna 4.

Proceeding with the collection of RSSI values, tags are identified using antennas 1, 2, 3, and 4 one at a time. Once RSSI values are collected, the data is analyzed to determine which tags are being identified most accurately with which antennas. This analysis will yield, from the RF perspective, the predicted location of the RFID tags in the enclosure. Note: Since the process of identifying tags requires transmitting RF energy in a metal enclosure (Faraday cage), we can assume that there will be areas where an antenna will identify a tag, other than directly over the antenna. This is due to the Fresnel zones (small pockets of high energy and null energy) produced by the RF energy moving and reflecting in the enclosure. Therefore, it cannot be assumed that a high RSSI value automatically implies that the tag is directly over an antenna reading the tag.

The RSSI values collected from reading individually from each reader antenna are analyzed and an RF map is generated of the predicted locations of the RFID tags in the enclosure. Based on the predicted locations, the enclosure RFID tag identification process can be optimized to improve the statistical probability of identifying all tags in the enclosure. In our example, the process improvement might include reading for a longer period on antenna 4, which has more tags directly above it.

In practice, RSSI values could be collected from multiple antenna and reader parameter settings in order to improve the predicted tag location accuracy. These parameters include the following:

1. Reader RF power;
2. Reader frequency;
3. Separate transmit and receive antennas; and
4. Type of antenna (where near and far field antennas exist in the same enclosure).

The total reading and analysis process might take from five to ten minutes. Therefore, the process would be accomplished during low system use hours. The process would be accomplished daily unless a previously determined number of items have been dispensed making it necessary to reset the reading parameters. The process would be run following the addition of any items to the enclosure.

Following analysis of the RFID tag RSSI values collected from all antennas operating at different frequencies, the system and process or method in accordance with aspects of the invention can identify poor performing RFID tags. The system/process can now start an iterative process of determining the ideal antenna/frequency/power level to improve the statistical probability of identifying these poor performing RFID tags. These tags exhibiting acceptable performance can be excluded from this optimization process. The parameters necessary to improve the statistical probability of identifying these poor performing RFID tags can be saved in a table and used in addition to the standard RFID read process.

Figure 7:
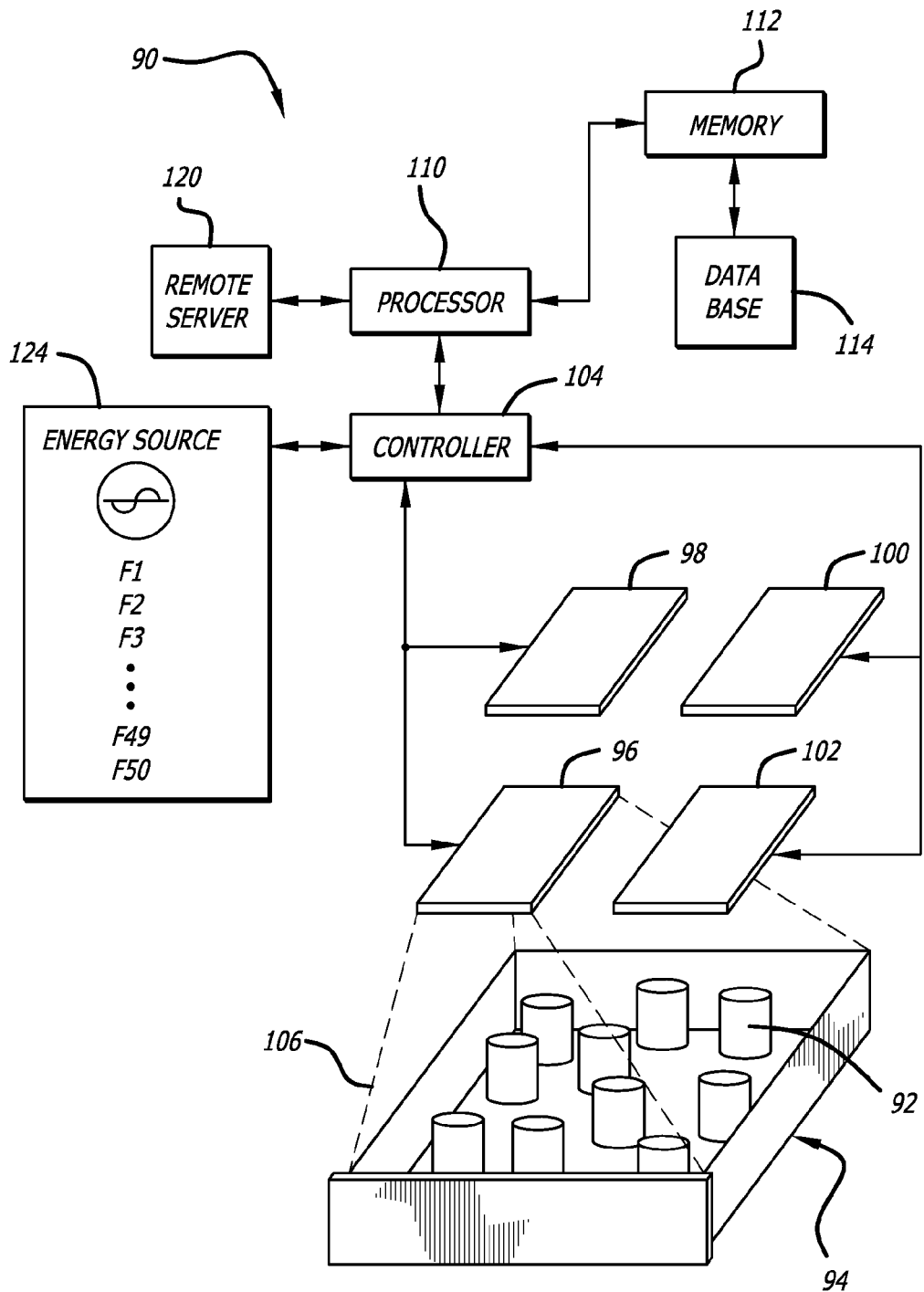
FIG. 7 is a block diagram of a system and method in accordance with the invention in which control over RFID reader antennas, their frequencies of operation, and the processing of RFID identification data is performed to identify and locate RFID-tagged items in the drawer of FIGS. 4 and 5.

FIG. 7 presents a block diagram of a system and method 90 for identifying and locating RFID tagged items 92 located in a drawer 94 below four RFID reader antennas 96, 98, 100, and 102. An antenna controller 104 controls the active state of the four antennas and sequentially activates them as required to track and locate the RFID tagged items 92 in the drawer 94 below the antennas. Each antenna has a beam 106 or interrogation zone at the storage space 122 (FIG. 3). In FIG. 7, the beam of antenna 96 is shown by numeral 106. The beams of the other antennas 98, 100, and 102 are not shown to preserve clarity in the figure, but likewise cover the storage space from their respective positions. The position of the antennas in relation to the drawer 94 may vary. In another embodiment, the antennas may be placed below the drawer. It should be noted that the diagram of FIG. 7 is exaggerated somewhat so that the relative positions of the components can be more clearly seen. The figure is not to scale.

A processor 110 controls the antenna controller 104 and receives RFID data ("identification data") detected by the antennas 96, 98, 100, and 102 for processing. A memory 112 is used by the processor to store the identification data in a data base or data bases 114. Among other data, the data base 114 includes scan data for poor performing RFID tags. The processor is also connected in this embodiment to the Internet for communicating with a remote server 120 or other devices as needed. The communication link may be hard-wired or wireless, as needed.

Exemplary Processes

A standard data scan and a concentrated data scan are described. The plurality of antennas 96, 98, 100, and 102 are mounted in different positions in relation to an enclosure (for example enclosure 60 in FIG. 3) to interrogate or "scan" the internal storage space 122 of that enclosure in which RFID tagged items are stored. Each stored item has an RFID tag with an identification number. The processor 110 is programmed to control the antenna controller to perform a standard data scan of the storage space. A signal generator or "energy source" 124 is controlled by the antenna controller 104 to output a plurality of known frequencies in a frequency-hopping set of frequencies. In this case, the set of frequency-hopping frequencies comprises fifty frequencies, F1 through F50. The antenna controller applies energy of the first frequency F1 to the first antenna 96 to scan the storage space 122. The antenna controller includes an RSSI module (not shown) in this embodiment. The identification data from all responding tags is received by the controller 104 and the RSSI number or level from each responding tag is determined. This data is forwarded to the processor 110 for storage in a data base 114.

The controller 104 then applies energy from the energy source 124 at the next frequency F2 in the set of frequency-hopping frequencies to the next antenna 98 to identify RFID tags in the storage space 122. The same is done for the third frequency F3, which is injected into the storage space by the third antenna 100 and for frequency F4 which is injected into the storage space by the fourth antenna 102. The controller then cycles the antennas by applying energy at frequency F5 to the first antenna 96 for RFID data collection. The controller cycles through all four antennas many times until energy of all fifty of the frequency-hopping frequencies has been injected into the storage space. The frequency-hopping energy is thus applied sequentially in this embodiment.

The processor then compares the identifications of the articles in the storage space identified in the present scan to those identified in a previous data scan to determine if any articles are missing. If some are missing, the processor may search the data base for a door open signal having a time that falls within the time gap between the previous scan when the article was identified in the storage space and the time of the present scan. The processor may then label the medical article as "taken." However, if there was no "door open" signal in the interim, the missing item must still be located in the storage space and the processor will perform a concentrated data scan to attempt to locate the article. The processor will review the data base to determine the antenna that had the highest RSSI level when the missing article was last detected. The processor will then control the antenna controller 104 to inject energy into the storage space from only that highest RSSI antenna for the article for all fifty of the frequency-hopping frequencies. If the missing article is then located, the occurrence of the concentrated scan is entered into the data base along with the frequency of detection, the RSSI for the selected antenna, and the time. Other data may also be stored in the data base.

The processor may also control the antenna controller 104 to perform such a concentrated data scan using each of the four antennas. That is, the first antenna would be controlled to inject energy from all fifty frequency-hopping frequencies looking for the missing article as described above, and then the second antenna would be controlled to do the same, and then the third and fourth antennas are used in the same way. If the missing article is not found after the concentrated data scan, the processor determines that the missing article has been taken. The processor may communicate with the remote server as required.

In another aspect, the antenna controller 104 may only perform the above standard and concentrated scans once a day, for example during off-hours when the company is closed for business, such as a midnight. This approach would be more useful for inventory on consignment where the identification of who took the item is not needed. After this type of scan, taken items may be automatically reordered. In another example, the antenna controller may perform the above scans each time a door-open signal is received, after the door or drawer is closed again. This approach is more applicable to an "access control" system where narcotics are stored in the ADC.

In yet a further aspect, the system and method of the invention may be used to verify the delivery of medical articles to an ADC. As an example, the pharmacy may prepare a restocking order for an ADC and notify the ADC processor 44 (FIG. 2) that the order is being sent. In accordance with aspects of the invention, once the ADC door or drawers are closed after restocking, the processor 110 will control the antenna controller to perform a standard data scan to verify that all items sent by the pharmacy are in the ADC. If all are identified in the standard data scan, the ADC processor confirms to the pharmacy server that all items have been received. If some articles are not identified under the standard data scan, the antenna controller will then perform the concentrated data scan to further search for the missing articles. If the missing articles are still not found, the processor will notify the pharmacy server 120 that certain articles were not received. The pharmacy may then send a person to check manually the ADC for the missing articles or to bring the missing articles for manual restocking.

It should be noted that various types of antennas may function acceptably. However, it has been found by the inventor that "patch" antennas work particularly well for small RFID tags.

The invention is intended to provide a read process that ensures the highest statistical probability of identifying all RFID tags contained in the RF-enabled enclosure irrespective of integrated circuit, antenna, orientation, position, package material, and location in the enclosure.

Although RFID tags are used herein as an embodiment, other data carriers that communicate through electromagnetic energy may also be usable.

Unless the context requires otherwise, throughout the specification and claims that follow, the word "comprise" and variations thereof, such as, "comprises" and "comprising" are to be construed in an open, inclusive sense, which is as "including, but not limited to."

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims.

What is claimed is:

1. A wireless automated reader system to identify medical items having a data carrier associated with them by reading the data carriers, the data carriers transmitting identification signals in response to being activated by electromagnetic energy ("EM energy") of a predetermined range of frequencies, the medical items being stored in a storage space of an enclosure, the system comprising:
   a plurality of reader antennas located at different positions, each of which has a beam covering the entire storage space of the enclosure for activating data carriers of medical items residing in the storage space and receiving identification signals transmitted by the activated data carriers;
   a processor having a memory;
   an energy source having a plurality of different frequency-hopping frequencies each frequency of which is within the predetermined range of frequencies to which the data carriers respond with transmitted identification signals, the energy source being responsive to control signals to provide injection signals to reader antennas;
   an antenna controller adapted to provide control signals to the energy source in a standard data scan to cause the energy source to deliver the injection signals having different frequency-hopping frequencies to multiple antennas of the plurality of reader antennas one at a time wherein only one reader antenna of the multiple antennas injects a single injection signal into the storage space at a time with the other of the multiple antennas not injecting any signals into the storage space at that time, the antenna controller cycling through the plurality of different frequencies of the injection signals one-by-one through the multiple antennas and to cycle through the plurality of injection signals having different frequency-hopping frequencies until the entire plurality of differing frequency injection signals has been completely injected, doing this sequentially antenna by antenna so that only one antenna is injecting at once;
   wherein the antenna controller includes a received signal strength indicator ("RSSI") module that is configured to analyze received signal strength of each received response from the data carriers to the injected signals, and the antenna controller also communicates identification signals representing the frequency, the reader antenna location, the received signal strength, and the identification response from each of the responding data carriers;
   wherein, the processor is programmed to receive the identification signals received by the antennas and store in the memory the identification signals as a standard data scan associated with a particular time;
   receiving the RSSI value from each antenna for each frequency for each of the detected data carriers and creating an RF map of predicted locations of data carriers in the storage space;
   wherein the processor is programmed to analyze the standard data scan and to determine if a medical item was not identified by all the antennas;
   if a medical item was not identified by an antenna, the antenna controller is further adapted to deliver the plurality of injection signals in a concentrated data scan in which the antenna controller controls the energy source to deliver the entire plurality of injection signals using all of the frequency-hopping frequencies sequentially to the multiple antennas one-by-one and to iteratively vary the RF power of those injection signals with all other antennas being off;
   wherein the processor is further programmed to compare the identification signals generated in a present data scan to identification signals previously generated and stored in the memory of a prior data scan to determine if any medical items are missing or have been added between the prior data scan and the present data scan;
   wherein the processor is also programmed to receive an RSSI value and identification of a data carrier that was not activated in the standard data scan by an antenna and determine from a concentrated data scan which frequency and power level activates the poor performing data carrier and store the data in a table in the memory along with the data from the standard data scan for use in future scans of the storage space;
   a door covering an opening in the storage space through which medical items are added to the storage space and are removed from the storage space, the door having a door sensor that automatically provides a door open signal when the door is opened;
   wherein the processor is further programmed to monitor door open signals and record such a signal and its time in the memory; and
   wherein the processor is programmed in the case where an item that was in the storage space in a last previous scan is not found in a present scan, to check if a door open signal was received between the last scan and the present scan and if so, to indicate that the medical item not found in the present scan was taken, or in the case where no door open signal was recorded, to control the antenna controller to perform a concentrated scan for the medical item that was undetected under the present standard scan.

2. The wireless automated reader system of claim 1, wherein the enclosure comprises metallic walls positioned around the storage space.

3. The wireless automated reader system of claim 1, wherein the processor is programmed to notify a remote server each time the comparison of a present data scan to a prior data scan determines that a medical item is missing from the storage space.

4. The wireless automated reader system of claim 3, wherein the processor is further programmed to identify any new medical items identified in the data scan, compare the new medical items identified in the storage space to a predetermined list of expected new medical items to be placed into the storage space.

5. The wireless automated reader system of claim 4, wherein the processor is further programmed to control the antenna controller to provide control signals to the energy source to cycle through all of the plurality of injection signals having different frequency-hopping frequencies at a selected reader antenna.

6. The wireless automated reader system of claim 1, wherein the storage space is devoid of metallic portions whereby medical items placed in the storage space will not come into direct contact with any metallic portions that may detune their data carriers.

7. A method for wirelessly reading data carriers associated with medical items to identify medical items, the data carriers transmitting identification signals in response to electromagnetic energy ("EM energy") having a predetermined range of frequencies, the medical items being stored in a storage space of an enclosure, the method comprising:
directing a plurality of reader antenna beams one at a time from a plurality of separate reader antennas located at different positions into the storage space of the enclosure for activating data carriers of medical items residing in the storage space and receiving identification signals transmitted by the activated data carriers, wherein each of the beams covers the entire storage space;
delivering a plurality of injection signals to multiple antennas of the plurality of reader antennas as a standard data scan, the injection signals having different frequencies selected from a plurality of frequency-hopping frequencies each of which is within the predetermined range of frequencies of the EM energy, the plurality of injection signals of different frequencies being delivered one-by-one to the reader antennas, and cycling through the plurality of injection signals having different frequency-hopping frequencies one per antenna sequentially;
receiving responsive identification signals from data carriers located in the storage space;
storing in a memory the received identification signals as a standard data scan associated with a particular time;
analyzing signal strength of each received response from the data carriers to the injected signals using a received signal strength indicator ("RSSI"), the reader antenna location, the received signal strength, and the identification response from each of the responding data carriers;
storing in memory the identification signals as a standard data scan associated with a particular time;
receiving the RSSI value from each antenna for each frequency for each of the detected data carriers and creating an RF map of predicted locations of data carriers in the storage space;
analyzing the standard data scan to determine if a medical item was not identified by all the reader antennas;
if a medical item was not identified by an antenna, delivering the plurality of injection signals in a concentrated data scan in which the entire plurality of injection signals using all of the frequency-hopping frequencies sequentially to the multiple antennas one-by-one and to iteratively vary the RF power of those injection signals with all other antennas being off;
comparing the identification signals generated in a present data scan to identification signals previously generated in a prior data scan and stored to determine if any medical items are missing or have been added between the prior data scan and the present data scan;
comparing the identification signals generated in a present data scan to identification signals previously generated and stored in the memory of a prior data scan to determine if any medical items are missing or have been added between the prior data scan and the present data scan;
receiving an RSSI value and identification of a data carrier that was not activated in the standard data scan by a reader antenna and determining from a concentrated data scan which frequency and power level activates the poor performing data carrier and storing the data in a table in the memory along with the data from the standard data scan for use in future scans of the storage space;
sensing a door opening, wherein the door covers an opening in the storage space through which medical items are added to the storage space and are removed from the storage space, and automatically providing a door open signal when the door is opened;
monitoring door open signals and recording such a signal and its time in memory; and
in the case where an item that was in the storage space in a last previous scan is not found in a present scan, checking if a door open signal was received between the last scan and the present scan and if so, indicating that the medical item not found in the present scan was taken, or in the case where no door open signal was recorded, performing a concentrated scan for the medical item that was undetected under the present standard scan.

8. The method for wirelessly reading data carriers of claim 7, further comprising notifying a remote server each time a missing medical item is determined to have been taken from the storage space.

9. The method for wirelessly reading data carriers of claim 7, further comprising identifying any new medical items detected in a data scan, and comparing the new medical items identified in the storage space to a predetermined list of expected new medical items to be placed into the storage space.

10. The wireless automated reader system of claim 1 wherein the reader antennas are located in respect to the storage space in at least one of above or below the storage space.

11. The wireless automated reader system of claim 1 wherein the processor is further programmed to automatically contact a remote server to automatically reorder a medical item that was determined to be missing from the storage space by data scans.

12. The wireless automated reader system of claim 1 wherein the processor is further programmed to compare the identifications of new items detected in the storage space to a restocking order and to notify a remote server if certain items of that restocking order were not received.

13. The method for wirelessly reading data carriers of claim 7, further comprising varying the reader antenna to which injection signals are provided, varying the frequency of the injection signals, and varying the level of RF power over multiple activation and read cycles of the data carriers in the storage space.

14. The method for wirelessly reading data carriers of claim 7, wherein the step of directing a plurality of reader antenna beams comprises directing the antenna beams from a location in respect to the storage space from at least one of above or below the storage space.

15. The method for wirelessly reading data carriers of claim 7, further comprising automatically contacting a remote server to reorder a medical item that was determined to be missing from the storage space by data scans.

16. The method for wirelessly reading data carriers of claim 7, further comprising comparing the identifications of new items detected in the storage space to a restocking order and to notify a remote server if certain items of that restocking order were not received.

17. The wireless automated reader system of claim 1, wherein the processor is further programmed to analyze the identification data of a previous data scan to determine the reader antenna that had a higher return signal strength than another reader antenna when the missing item was last identified as being present, and to control the energy source and antenna controller to use the concentrated data scan at the identified reader antenna to determine if the missing item is in the storage space.

* * * * *